US00RE42767E

(19) United States
(12) Reissued Patent
Willemsen et al.

(10) Patent Number: US RE42,767 E
(45) Date of Reissued Patent: Oct. 4, 2011

(54) ADJUSTABLE VEHICLE CONTROL PEDALS

(75) Inventors: Larry Willemsen, Morpeth (CA); Gregory Scott Kolwich, Beverly Hills, MI (US)

(73) Assignee: KSR Industrial Corporation, Ridgetown (CA)

(21) Appl. No.: 10/615,553

(22) Filed: Jul. 8, 2003

Related U.S. Patent Documents

Reissue of:
(64) Patent No.: 6,453,767
Issued: Sep. 24, 2002
Appl. No.: 09/715,731
Filed: Nov. 17, 2000

U.S. Applications:
(60) Division of application No. 09/309,526, filed on May 11, 1999, now Pat. No. 6,151,986, which is a continuation-in-part of application No. 09/135,346, filed on Aug. 17, 1998, now Pat. No. 6,178,847, which is a continuation-in-part of application No. 08/947,563, filed on Oct. 9, 1997, now abandoned.

(51) Int. Cl.
*G05G 1/30* (2008.04)
(52) U.S. Cl. ..... 74/512; 180/334; 74/513
(58) Field of Classification Search ..... 74/512, 74/513, 560; 180/320, 334, 335
See application file for complete search history.

(56) References Cited

U.S. PATENT DOCUMENTS

| | | | | |
|---|---|---|---|---|
| 2,860,720 | A | 11/1958 | Huff et al. | |
| 2,906,342 | A | 9/1959 | Brin | |
| 2,908,183 | A | 10/1959 | DeGiovanni | |
| 2,936,867 | A | 5/1960 | Perry | |
| 3,301,088 | A | 1/1967 | White | |
| 3,319,487 | A | 5/1967 | Lystad et al. | |
| 3,338,348 | A | 8/1967 | Roethlisberger et al. | |
| 3,400,607 | A | 9/1968 | Smith | |
| 3,511,109 | A | 5/1970 | Tanaka | |
| 3,643,524 | A | 2/1972 | Herring | |
| 3,691,868 | A | 9/1972 | Smith | |
| 3,754,480 | A | 8/1973 | Bradnar et al. | |
| 3,765,264 | A | 10/1973 | Bruhn, Jr. | |
| 3,798,995 | A | 3/1974 | Schroter | |
| 3,828,625 | A | 8/1974 | Bruhn, Jr. | |
| 3,958,677 | A | 5/1976 | Spanelis | |
| 3,975,972 | A | 8/1976 | Muhleck | |
| 4,497,399 | A | 2/1985 | Kopich | |
| 4,683,977 | A | 8/1987 | Salmon | |
| 4,779,481 | A | 10/1988 | Natzke et al. | 74/512 |
| 4,870,871 | A | 10/1989 | Ivan | |

(Continued)

FOREIGN PATENT DOCUMENTS

| | | |
|---|---|---|
| DE | 26 44 628 | 4/1977 |

(Continued)

*Primary Examiner* — Vicky A Johnson
(74) *Attorney, Agent, or Firm* — Gifford, Krass, Sprinkle, Anderson & Citkowski, P.C.

(57) ABSTRACT

An adjustable control pedal apparatus is used in a motor vehicle. The pedal apparatus includes a pedal assembly mounted to a support bracket mounted to the vehicle by a pivot shaft. The pivot shaft contains a worm gear. The pedal assembly includes a pedal arm pivotally mounted to an inner arm. A jack screw extends between the inner arm and pedal arm. The jack screw has a pinion portion on one end which is driven by the worm gear of the pivot shaft. A threaded portion of the jack screw is threadably received in a slide block mounted to the pedal arm. Rotation of the pivot shaft by a motor correspondingly turns the jack screw to adjust the position of the pedal.

10 Claims, 9 Drawing Sheets

U.S. PATENT DOCUMENTS

| | | | | |
|---|---|---|---|---|
| 4,875,385 | A | 10/1989 | Sitrin | |
| 4,912,997 | A | 4/1990 | Malcolm et al. | |
| 4,989,474 | A | 2/1991 | Cicotte et al. | |
| 5,010,782 | A | 4/1991 | Asano et al. | |
| 5,078,024 | A | 1/1992 | Cicotte et al. | |
| 5,086,663 | A | 2/1992 | Assano et al. | |
| 5,172,606 | A | 12/1992 | Dzioba et al. | |
| 5,351,573 | A | 10/1994 | Cicotte | |
| 5,385,068 | A | 1/1995 | White et al. | |
| 5,408,899 | A | 4/1995 | Stewart | |
| 5,460,061 | A | 10/1995 | Redding et al. | |
| 5,497,677 | A | 3/1996 | Baumann et al. | |
| 5,632,183 | A | 5/1997 | Rixon et al. | |
| 5,722,302 | A | 3/1998 | Rixon et al. | |
| 5,771,752 | A | 6/1998 | Cicotte | |
| 5,996,438 | A | 12/1999 | Elton | 74/512 |
| 5,996,439 | A | 12/1999 | Elton | 74/512 |
| 6,019,015 | A | 2/2000 | Elton | 74/512 |
| 6,073,515 | A | 6/2000 | Elton et al. | 74/512 X |
| 6,151,985 | A | 11/2000 | Garber et al. | 74/512 |

FOREIGN PATENT DOCUMENTS

| | | |
|---|---|---|
| DE | 26 44 628 A1 | 4/1977 |
| FR | 95 12130 | 4/1997 |
| JP | 58-47923 | 3/1983 |

ADJUSTABLE VEHICLE CONTROL PEDALS

Matter enclosed in heavy brackets [ ] appears in the original patent but forms no part of this reissue specification; matter printed in italics indicates the additions made by reissue.

This is a divisional of patent application Ser. No. 09/309,526, filed May 11, 1999 now U.S. Pat. No. 6,151,986, which is a continuation-in-part application of patent application Ser. No. 09/135,346, filed Aug. 17, 1998 now U.S. Pat. No. 6,178,847, which is a continuation-in-part of Ser. No. 08/947,563, filed Oct. 9, 1997, now abandoned.

BACKGROUND OF THE INVENTION

The present invention relates generally to adjustable vehicle control pedals, and more particularly to such pedals which can conveniently fit into existing motor vehicle design packages.

For many years, vehicle manufacturers and/or designers have been aware of ergonomic considerations for drivers of different stature. In an effort to accommodate different sizes of drivers, vehicle controls (steering wheels, etc.) have been designed with adjustability to accommodate this wide range of driver size. The importance of creating a harmony for the occupant, whereby all vehicle controls adjust to the driver has been increasingly more important from an ergonomic and safety point of view. However, package space, functional safety and cost have historically excluded pedals from adjustability.

Thus, it is an object of the present invention to provide an adjustable vehicle control pedal apparatus which ergonomically accommodates drivers of different stature, yet advantageously substantially fits into current vehicle design packages. It is a further object of the present invention to provide such an apparatus which performs reliably, and can be incorporated in a vehicle at a relatively low cost. Yet further, it is an object of the present invention to provide such an apparatus which operates much like a standard pedal and advantageously allows for carryover hardware and switches.

SUMMARY OF THE INVENTION

The present invention addresses and solves the problems/drawbacks enumerated above, and encompasses other features and advantages as well. The present invention comprises an adjustable control pedal apparatus for use in a vehicle having a pitch axis. The brake and/or clutch pedal apparatus comprises a driven pedal arm rotatably and operatively mounted to the vehicle about a rotation axis substantially parallel to the pitch axis. An inner pedal arm is adjustably mounted to the driven pedal arm, and a pedal is attached to the inner pedal arm. The brake and/or clutch pedal apparatus further comprises means, substantially disposed within the driven pedal arm and the inner pedal arm, for varying the proximity of the pedal to the operator.

A preferred embodiment of the invention includes a jack screw which moves a block member having pins which travel in slots in the inner and driven pedal arms to vary the proximity of the pedal.

The accelerator pedal apparatus of the present invention comprises an inner pedal arm rotatably and operatively mounted to the vehicle about a rotation axis substantially parallel to the pitch axis. A driven pedal arm is adjustably mounted to the inner pedal arm, and a pedal is attached to the driven pedal arm. The accelerator pedal apparatus also comprises means, substantially disposed within the inner pedal arm and the driven pedal arm, for varying the proximity of the pedal to the operator.

A first alternative preferred embodiment of an adjustment apparatus for a brake pedal has a pedal arm which encompasses more of the inner pedal arm.

A second preferred alternative preferred embodiment of the invention is directed to an adjustment apparatus for a brake pedal and includes a driven pedal arm having a pair of slots for receiving a clevis mounted to a jack screw rod. The clevis is connected to the inner pedal arm connected to the clevis by a pin. The inner pedal arm has a slot receiving for a slide block. A pinion gear is moved around the jack screw to position the pedal arm and pedal.

A third preferred alternative embodiment of the invention is particularly directed to an adjustment apparatus for an accelerator pedal having a pedal assembly which is mounted to a bracket by a pivot shaft. The pedal assembly includes an inner arm and a pedal arm. The pivot shaft has a worm gear portion which engages a pinion on an end of a jack screw. The jack screw is rotatably mounted to the inner arm. The jack screw is received in a threaded member mounted to the pedal arm. The motor turns the pivot shaft to rotate the jack screw and move the pedal arm with respect to the inner arm.

BRIEF DESCRIPTION OF THE DRAWINGS

Other objects, features and advantages of the present invention will become apparent by reference to the following detailed description and to the drawings, in which.

DETAILED DESCRIPTION OF THE PREFERRED EMBODIMENTS

Figure 1:
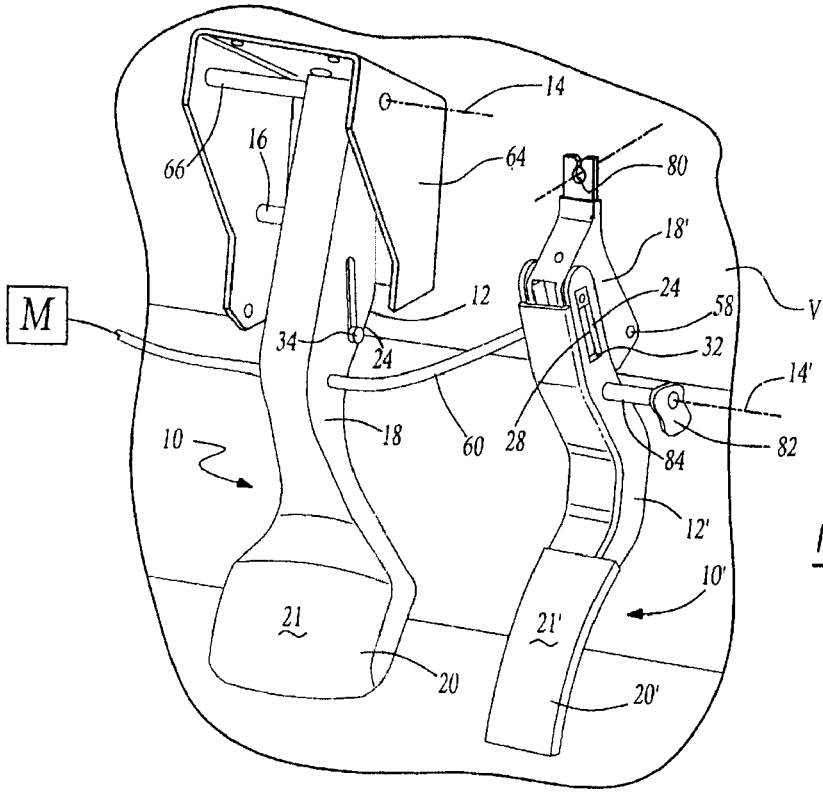
FIG. 1 is a cutaway perspective view showing the adjustable brake pedal apparatus and accelerator pedal apparatus of the preferred embodiment of the present invention mounted to the body of the vehicle.

Referring now to FIG. 1, the two adjustable control pedal apparatuses of the present invention are designated generally as 10 and 10'. Adjustable control pedal apparatus 10 depicts a brake pedal apparatus. However, it is to be understood that this apparatus may work equally well as a clutch pedal apparatus. Adjustable control pedal apparatus 10' depicts an accelerator pedal apparatus. However, if is to be understood that any of the pedal apparatuses 10 disclosed herein may be useful for any vehicle control. Also, although a motor vehicle V is shown, it is to be understood that any of the embodiments of the vehicle control pedals 10 described herein may be equally useful in any type of vehicle, including but not limited to trucks, airplanes, and the like.

Figure 9:
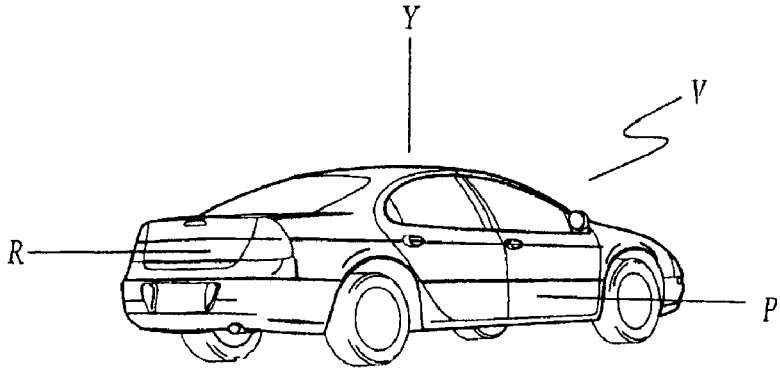
FIG. 9 is an isometric view of a motor vehicle showing the pitch, roll and yaw axes.

Referring first to the brake and/or clutch pedal apparatus, the adjustable control pedal apparatus 10 of the present invention comprises a driven pedal arm 12 rotatably and operatively mounted to the vehicle V about a rotation axis 14 substantially parallel to the pitch axis P. The pitch axis P, roll axis R and yaw axis Y are shown in FIG. 9. Driven pedal arm 12 may be operatively connected to the vehicle V by any suitable, conventionally known means. For example, shaft 16 may attach to any standard brake booster push rod and stop light switch and be retained by a clevis pin (not shown).

In inner pedal arm 18 is adjustably mounted to driven pedal arm 12. A pedal 20 is attached to inner pedal arm 18. The brake and or clutch pedal apparatus 10 may be rotatably mounted to the vehicle V by any suitable means. However, in the preferred embodiment, the apparatus 10 is mounted in a support bracket 64 which is similar to the support of a conventional pedal. Both the inner pedal arm 18 and the driven pedal arm 12 are mounted on the same pivot shaft 66.

The brake pedal 20 includes a cam face which accommodates different foot sizes at varying points of adjustment. The cam face has a lower portion which curves toward the fire wall from the top portion of the brake pedal. When the brake pedal is in a full forward position the top portion of the pedal is in position for depression by the driver. However, when the pedal is adjusted toward the rear of the vehicle, the pedal raises and the lower portion moves outwardly so as to be in the position for depression by the fool of the driver. The pad 21 is preferably cast as part of the pedal 20; thus, the pad 21 would be "as cast" and provide for marketing/styling inputs such as molding in a trade name which could provide driver awareness of the adjustable pedal feature. However it is to be understood that a standard rubber/elastomeric or the like conventionally known material may be disposed on the pedal 20 to provide the pad 21.

Although it is to be understood that any suitable material may be used, in the preferred embodiment the driven pedal arm 12 and the inner pedal arm 18 are cast from a magnesium alloy. This is advantageous in that the cast magnesium alloys allow for integration of the complex shape to both house the gearing and screw (described further hereinbelow) and integrate the pad 21. It is further advantageous in that the cast magnesium alloys provide suitable strength while being light in weight. It is estimated that the weight of the brake pedal apparatus 10, including the motor M (described hereinbelow) is 2.20 kilograms.

Figure 2:
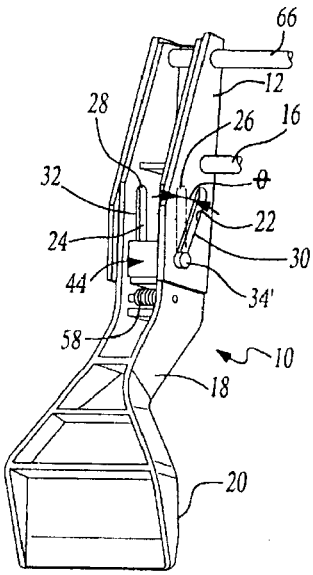
FIG. 2 is a back perspective view of the adjustable brake pedal apparatus of the preferred embodiment of the present invention.

The adjustable control pedal apparatus 10 further comprises means, substantially disposed within the driven pedal arm 12 and the inner pedal arm 18, for varying the proximity of the pedal 20 to the operator. It is to be understood that this varying means may comprise any suitable means, however, in the preferred embodiment, the varying means comprises a first pair of opposed slots 22, 24 defined in the driven pedal arm 12. A second pair of opposed slots 26, 28 are defined in the inner pedal arm 18, the second pair of slots 26, 28 being angularly offset from the first pair of slots 22, 24 (as best seen in FIG. 2), whereby there are two opposed sets 30, 32 of angularly offset slots, one set 30 comprising one of the driven pedal arm slots 22 and an adjacent inner pedal arm slot 26, the other set 32 comprising the other driven pedal arm slot 24 and the other inner pedal arm slot 28.

It is to be understood that the angular offset may be at any angle suitable to provide for desired pin 34, 34' translation and a subsequent predetermined pedal 20 movement with reasonable torque requirements for the motor M. In the preferred embodiment, the angle θ between a set 30, 32 of angularly offset slots is approximately 15°. It is to be further understood that the slot sets 30, 32 in either or both of the apparatuses 10, 10', 10" may be disposed either above or below the respective pivot point on the pedal apparatus 10, 10', 10".

The varying means may further comprise two pins 34, 34' operatively mounted within the inner pedal arm 18, one of the pins 34 extending outwardly through one of the opposed sets 30 of angularly offset slots, and the other pin 34' extending outwardly through the other 32 opposed set of angularly offset slots.

Figure 4:
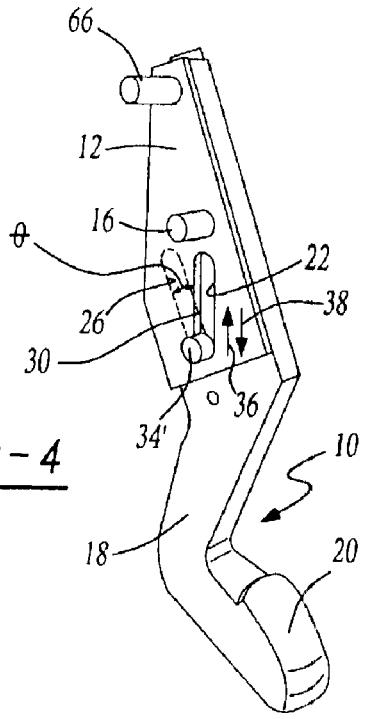
FIG. 4 is a side perspective view of the adjustable brake pedal of the preferred embodiment of the present invention, showing the angular offset between a slot in the driven pedal arm and an adjacent slot in the inner pedal arm.
Figure 5:
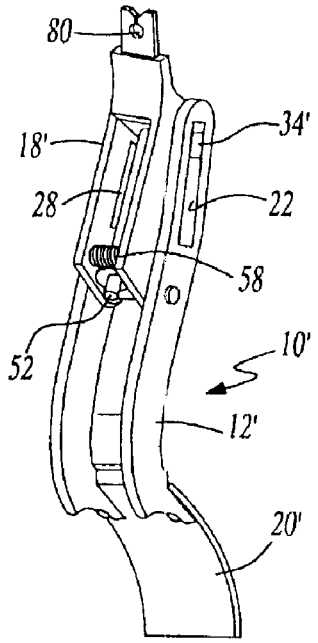
FIG. 5 is a back perspective view of an adjustable accelerator pedal apparatus of the preferred embodiment of the present invention.

The varying means may further comprise means for translating the pins 34, 34' in a first 36 or a second 38 direction, whereby when the pin 34, 34' is translated in the first direction 36, the pedal 20 is moved toward the operator, and when the pin 34, 34' is translated in the second direction 38, the pedal 20 is moved away from the operator. However, it is to be understood that, although first direction 36 is depicted in FIG. 4 as being in a generally upward direction, first direction 36 may be in any direction suitable to move pedal 20 toward the operator. Similarly, it is to be understood that second direction 38 may be in any direction suitable to move pedal 20 away from the operator. When the pedal apparatus 10 is rotated, the pad 21 on the inner pedal arm 18 provides a normal contact with the ball of the operator's foot through the adjustment.

Figure 6:
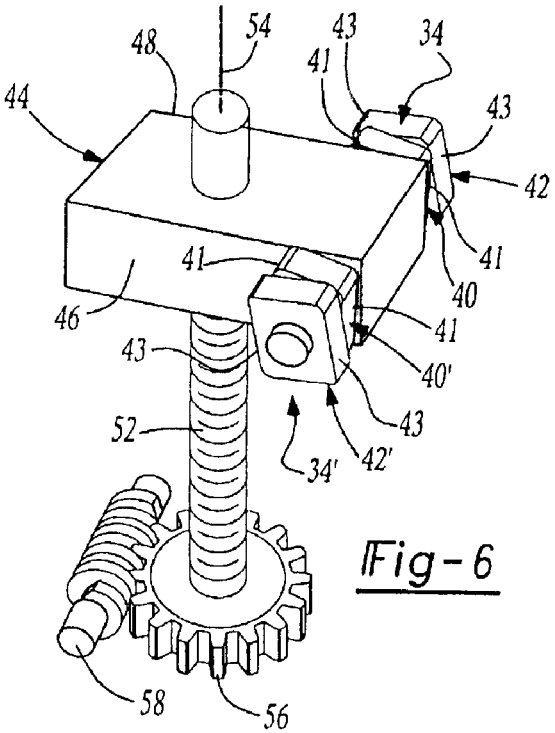
FIG. 6 is an enlarged perspective view of the gear and screw pin-translating assembly shown in FIG. 5.
Figure 7:
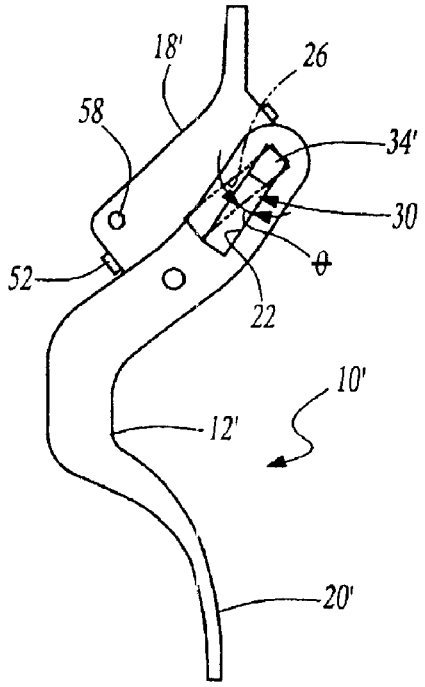
FIG. 7 is a side view of the adjustable accelerator pedal of the preferred embodiment of the present invention showing the angular offset between a slot in the driven pedal arm and an adjacent slot in the inner pedal arm.

Each pin 34, 34' comprises an inner bearing member 40, 40' and an outer bearing member 42, 42', the members being rotatable with respect to each other (see FIG. 6). Each bearing member 40, 40', 42, 42' has at least two opposed load bearing surfaces 41, 43. The inner bearing member 40 is translatable within the inner pedal arm slot 28 in one of the sets 32, and the outer bearing member 42 is translatable within the driven pedal arm slot 24 in the same set 32. The inner bearing member 40' is translatable within the inner pedal arm slot 26 in the other set 30, and the outer bearing member 42' is translatable within the driven pedal arm slot 22 in the same set 30. The squared pins/bearing members 40, 40', 42, 42' provide a load bearing area on both arms 12, 18. This provides some area to transfer the load.

Although the slots 22, 24, 26, 28 are shown as being rectangular or oblong in shape, it is to be understood that these slots may be of any suitable geometric configuration.

Figure 3:
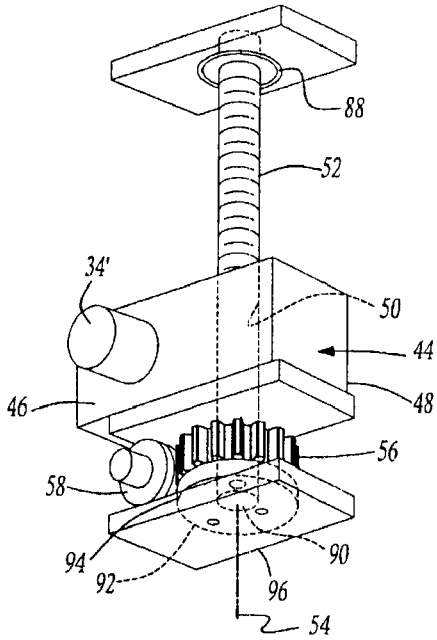
FIG. 3 is an enlarged perspective view of the gear and screw pin-translating assembly shown in FIG. 2.

It is to be understood that the pin translating means may comprise any suitable means, however in the preferred embodiment, this pin translating means comprises a block member 44 having two opposed ends 46, 48 and being disposed between the two opposed sets 30, 32 of angularly offset slots, the block member 44 having the pins 34, 34' extending outwardly from each of the two ends 46, 48, the block member 44 further having a threaded bore 50 extending therethrough, as seen in FIG. 3.

The pin translating means may further comprise a jack screw 52 threadingly engaged within the threaded bore 50 and longitudinally oriented about an axis 54 substantially parallel to a line perpendicular to the pitch axis P. A pinion gear 56 is attached to the jack screw 52. A worm gear 58 is meshingly engaged with the pinion gear 56. The screw 52 may be axially constrained by any suitable means; however in the preferred embodiment, this means includes a thrust bearing 88 into which the screw 52 may be press fit at one end. At the end distal from the thrust bearing 88, a suitable plug 92 receives screw 52 in plug bore 90. Plug 92 has suitable external threads 94 for threading engagement within plate 96.

Alternatively, block member 44 may be more square like in shape, being substantially the same length and height as bearing members 40, 40', 42, 42'. The axis 54 about which screw 52 is longitudinally oriented would then be approximately centered between bearing member 40 and bearing member 40'.

The pin translating means may further comprise means for driving the worm gear 58. It is to be understood that this driving means may comprise any suitable means. However, in the preferred embodiment, the worm gear driving means comprises a motor M and a rotating drive cable 60 operatively mounted to the motor M and to the worm gear 58. Although motor M is shown schematically apart from the pedal apparatus 10, it is to be understood that motor M may be pedal mounted in the brake and/or accelerator pedal apparatus; motor M may be mounted by support bracket 64; and/or motor M may be mounted by a separate bracket. Upon rotation of the worm gear 58 in a first direction, the block member 44 will be translated along the longitudinal axis 54 of the jack screw 52 and away from the pinion gear 56, and upon rotation of the worm gear 58 in a second direction, the block member 44 will be translated along the longitudinal axis 54 of the jack screw 52 and toward the pinion gear 56. As the end of block member 44 travel in each direction, the motor M will automatically shut down. The motor M will do so by any suitable means, including but not limited to a limit switch for detecting amp overload (overload limit switch); by automatically stalling at a predetermined torque value; a potentiometer; or an encoder wheel.

Figure 8:
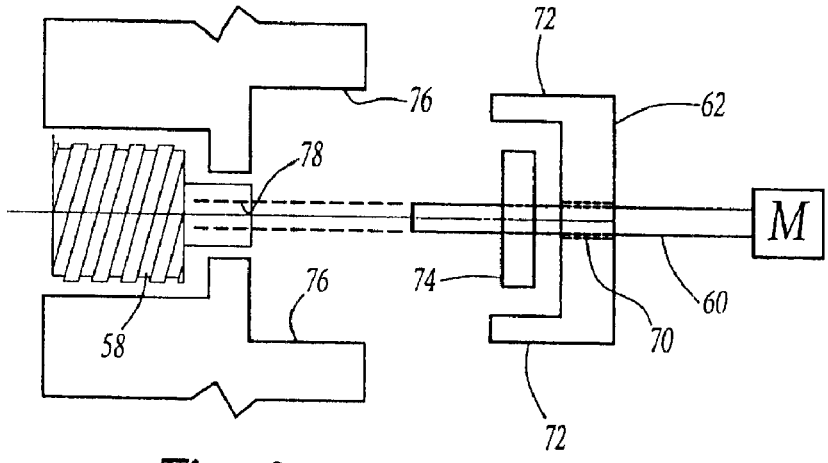
FIG. 8 is an enlarged schematic view showing a typical motor to drive cable to worm gear connection.

The cable 60 may be any suitable drive cable. However, in the preferred embodiment, cable 60 is a square end, rotating drive cable. it is to be understood that cable 60 may be operatively attached to worm gear 58 and motor M by any suitable means, such as by a suitable snap fit connecting assembly. However, in the preferred embodiment, as can be seen in FIG. 8, the cable 60 is attached to motor M and then extends through a bore 70 in a plug 62 which has external threads 72. A collar 74 is press fitted to cable 60 and retains cable 60 in plug 62. A portion of the inner pedal arm 18 has an internal threaded bore 76 to threadingly engage with plug 62. The square end cable 60 end fits into a square detent or socket 78 in the worm gear 58. The plug 62 having the cable 60 and collar 74 therewithin is then engaged with bore 76 to retain cable 60 in worm gear 58.

The current vehicle design packages provide acceptable space to adjust both pedals 20, 20' about 63.5 mm rearward (toward the operator) and about 10 mm downward. Modifications to the dash may be required to move the pedals 20, 20' forward (away from the operator) about 12 mm. It is to be understood that these adjustments are exemplary only, and that the pedals 20, 20' may be made to adjust within a smaller or wider range.

Although it is to be understood that any suitable material may be used, in the preferred embodiment, the driven pedal arm 12' is cast from a magnesium alloy. The inner pedal arm 18' is preferably injection molded from a suitably rigid polymeric material. The advantages above with regard to the brake pedal apparatus 10 materials apply equally here; however, the accelerator pedal apparatus 10' may be even lighter in weight, due to the use of polymeric material(s) for the inner pedal arm 18'. The driven pedal arm 12' is preferably cast from a magnesium alloy to provide styling harmony with the brake pedal apparatus 10. The weight of the accelerator is estimated to be about 0.67 kilograms.

The pedal pad 21' may also include a cam face (as with brake pedal apparatus 10) to accommodate different foot sizes at varying points of adjustment. The cam face in both pads 21, 21' includes an elongated face (as compared to conventional pads) such that as the pedal apparatus 10, 10', 10" is adjusted (as stated above), the pads 21, 21' maintain normal contact with the ball of the operator's foot through the adjustment.

Thus, additional adjustability is gained through the geometry of the cam faced pedal pads 21, 21'.

The remainder of the accelerator pedal apparatus 10' is as described above in relation to the brake pedal apparatus 10, 10". For example, the pin translating assembly also operates through two diverging slots (22, 26) and (24, 28), one set 30 being on one side of the apparatus 10, and the other set 32 being on the opposed side of the apparatus 10'.

Figure 10:
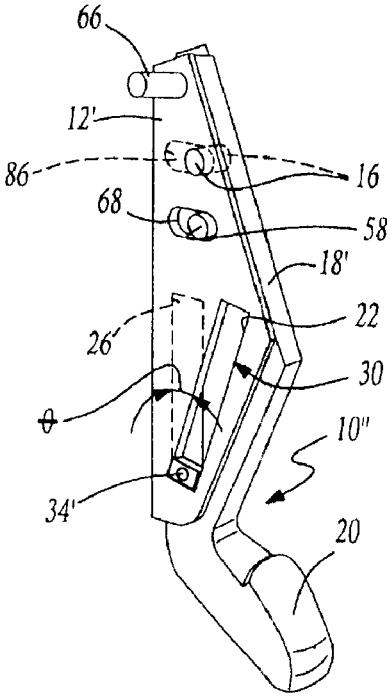
FIG. 10 is a side perspective view of a first alternative preferred embodiment of the brake pedal apparatus of the present invention.

A first alternative preferred embodiment of the adjustable brake pedal apparatus of the present invention is depicted generally as 10" in FIG. 10. In this embodiment, the driven pedal arm 12' encompasses more of the inner pedal arm 18'. A slot 68 for worm gear 58 is defined in driven pedal arm 12' in order to compensate for movement of inner pedal arm 18' and insure that the connection of cable 60 to worm gear 58 will not be compromised during pedal apparatus 10", adjustment. Further, the sets 30, 32 of opposed slots are rectangular in configuration, and the pins 34, 34' are the squared pins/inner, outer bearing members 40, 42, etc. as described above in relation to FIG. 6. The shaft 16 (which is attachable to the standard brake booster push rod as described above) is fixedly attached by a suitable means to each of the opposed side of driven pedal arm 12'. A slot 86 is defined in each of the opposed sides of inner pedal arm 18' in order to prevent actuation of the brakes during pedal 20 adjustment. The remainder of the apparatus 10" is as described hereinabove in relation to apparatus 10.

Figure 11:
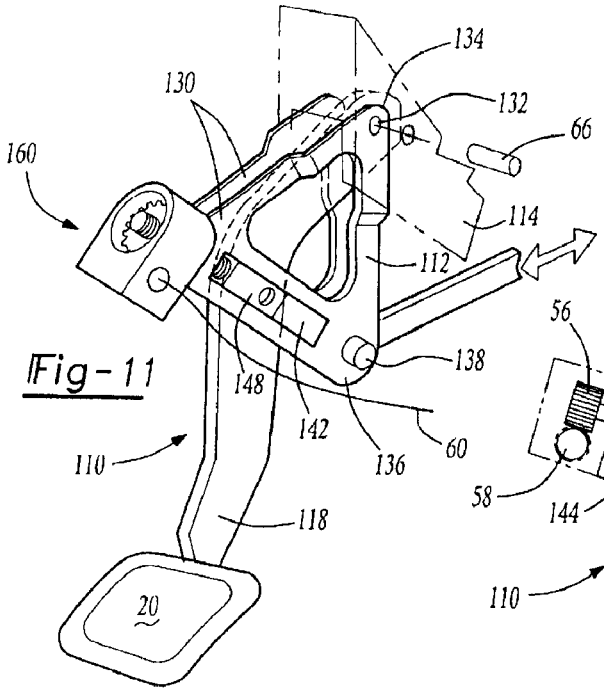
FIG. 11 is a perspective view of a second alternative embodiment of a brake pedal adjustment mechanism in accordance with the invention.
Figure 12:
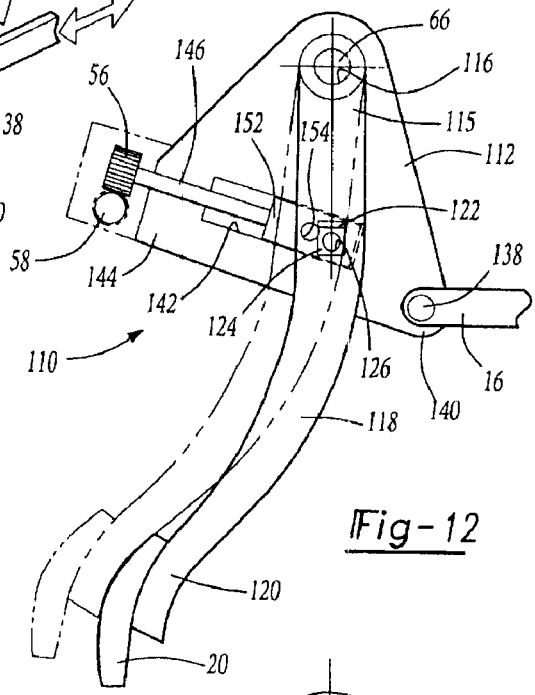
FIG. 12 is a sectional side view showing inner and driven pedal arms of the second alternative preferred embodiment of the brake pedal adjustment mechanism of the present invention.
Figure 13:
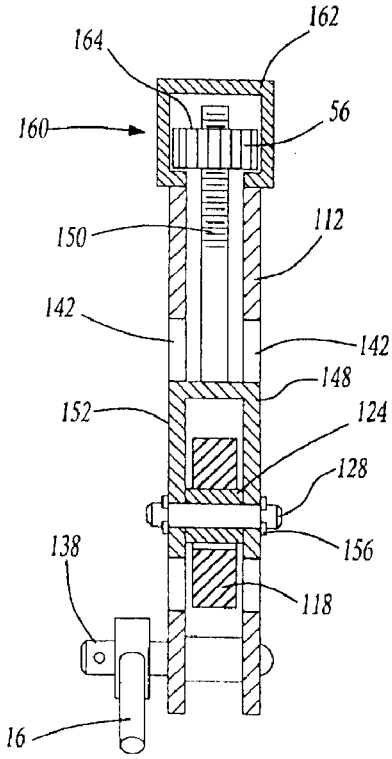
FIG. 13 is a top view of the second alternative preferred embodiment of the brake pedal adjustment mechanism of the present invention.
Figure 14:
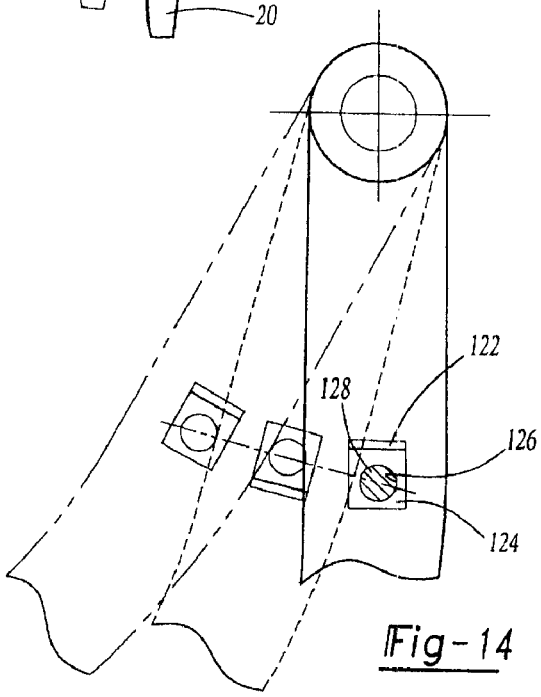
FIG. 14 is a partial side view of the pedal arm and slot of the second alternative preferred embodiment of the invention.

A second alternative preferred embodiment of the adjustable brake pedal apparatus 110 is shown in FIGS. 11, 12, and 13. The brake pedal apparatus 110 is similar to control apparatus 10 and like elements are referred to with the same reference numerals and characters as set forth above. The brake control apparatus 110 includes an inner pedal arm 118 and a driven pedal arm 112 pivotally mounted to the support bracket 114 by pin 66 in the same fashion as discussed above. However, a different mechanism for varying the position of the inner pedal arm 118 with respect to the driven pedal arm 112 is utilized.

As shown in FIG. 12, the inner pedal arm 118 has a throughbore 114 at an upper end 115 for receiving pin 66. The pedal 20 is formed at a lower end 120 of the pedal arm as discussed above. A slot 122 is formed transversely through a center portion of the inner pedal arm 118. The slot 122 is angled at in angle of approximately 75° with respect to the axis of translation of the jack screw to prevent friction from holding the side block 124. As discussed below, the slot 122 permits movement of a slide block 124. The slide block 124 has a throughbore 126 for receiving a pin 128.

As shown in FIGS. 11, 12, and 13, the driven pedal arm 112 has a pair of spaced apart side portions 130. The side portions 130 are spaced apart to receive the inner pedal arm 118 therebetween. A throughbore 132 is formed at an upper corner 134 of each of the side portions 130 to receive pin 66. Thus, the inner pedal arm 118 and driven pedal arm 112 pivot about pin 66 in the same fashion disclosed above.

As shown in FIGS. 11 and 12, stud 138 is mounted to a lower corner 140 of the side portions 130 to pivotally attach the shaft 16 which is attached to the standard brake rod. The side portions are formed to permit location of the stud 138 in the same position relative to the bracket as with a conventional brake pedal. Thus, the brake pedal mechanism of the invention may be substituted for a conventional brake pedal arm as an after market accessory. A slot 142 is formed in each side portion 130 to guide a jack screw 146 as it moves the inner pedal. The slots 142 extend in a direction between the lower corner 140 and a rearward corner 144.

As shown in FIGS. 11, 12, and 13, the jack screw 146 has a connector 148 extending at one end from a threaded portion 150. The connector 148 has a pair of arms 152 which are spaced apart to receive the inner pedal arm 118 and slide block 124 therebetween. Each of the arms 152 has a hole 154 to receive pin 128 to connect the jack screw rod 146 to the slide block 124 and inner pedal arm 118. A pair of cotter keys 156 are positioned through the ends of the pin 128 to hold the pin 128 in place. The arms 152 of the connector 148 have a rectangular profile and are received in the respective slots of the driven pedal arm to maintain the alignment of the jack screw.

A drive mechanism 160 is mounted at the rear corner 144 of the driven pedal arm. The drive mechanism 160 has a housing 162 which is mounted to extend between the side portions 130. The housing supports the pinion gear 56 and worm gear 58. The pinion gear 56 is centered with respect to the side portions 130 to receive the jack screw 146 in a threaded bore 164. The pinion gear 58 is mounted in meshing contact with the pinion gear 56 to be driven by drive cable 60 and motor M as discussed above. The slots 142 of the driven pedal arm 112 maintain the alignment of the connector and the jack screw with the axis of the pinion gear 56 during the operation of the drive mechanism 160.

As shown in FIG. 11, the slide block 124 is free to move within the slot 126 of the inner pedal arm 118 when the jack screw 146 is moved. Because the inner pedal arm pivots about the pivot axis and the connector is guided along a chord which moves with respect to the pivot axis, the slot 126 in the inner pedal arm 118 permits the slide block 124 and pin 128 to move along the chord as the radial distance to the pivot axis varies.

Referring now to the accelerator pedal apparatus, and more particularly to FIGS. 1 and 5-7, the adjustable control pedal apparatus 10' of the present invention comprises an inner pedal arm 18' rotatably and operatively mounted to the vehicle V about a rotation axis 14' substantially parallel to the pitch axis P. Inner pedal arm 18' may be operatively connected to the vehicle V by any suitable, conventionally known means. For example, the throttle cable (not shown) may operatively attach throughbore 80.

A driven pedal arm 12' is adjustably mounted to an inner pedal arm 18'. A pedal 20' is attached to driven pedal arm 12'. The accelerator pedal apparatus 10' may be rotatably mounted to the vehicle V by any suitable means. In the preferred embodiment, the apparatus 10' is mounted on a pivot shaft 84 in a support bracket 82 (most of which is shown broken away in FIG. 1) which is similar to the support of a conventional pedal, including standard nut, bolt and plastic bearings. However, it is preferred that the accelerator pivot (as at rotation axis 14') will be moved rearward (as compared to conventional accelerator pedals) to help maintain ratio integrity (ie. accelerator pedal travel to throttle angle ratio) during the various points of adjustment of pedal apparatus 10'. Further, power transmission may be synchronized through the cable 60 from the worm gear 58 on the brake pedal apparatus 10, 10".

A third alterative preferred embodiment of a pedal adjuster apparatus 210 for use with an accelerator pedal is shown in FIGS. 15-19. The pedal adjustment apparatus 210 includes a pedal assembly 212 pivotally mounted to a support bracket 214 by a pivot shaft 216. The pedal assembly 212 includes an inner arm 218 and a pedal arm 220. The pivot shaft 216 is rotated by the motor M as discussed below to adjust the position of the pedal arm 220.

Figure 15:
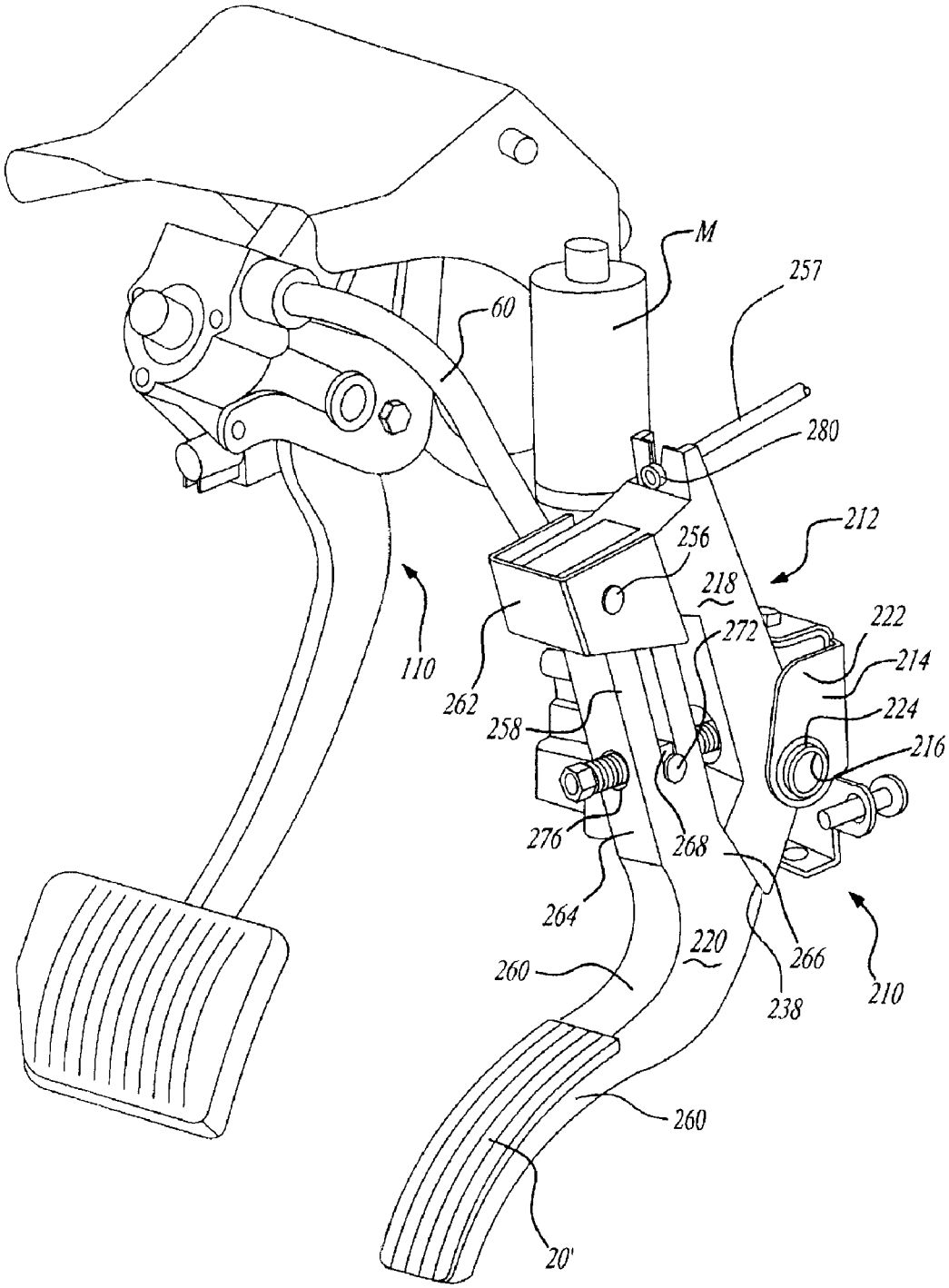
FIG. 15 is a perspective view of an accelerator pedal of a third alternative preferred embodiment pedal of the present invention.
Figure 17:
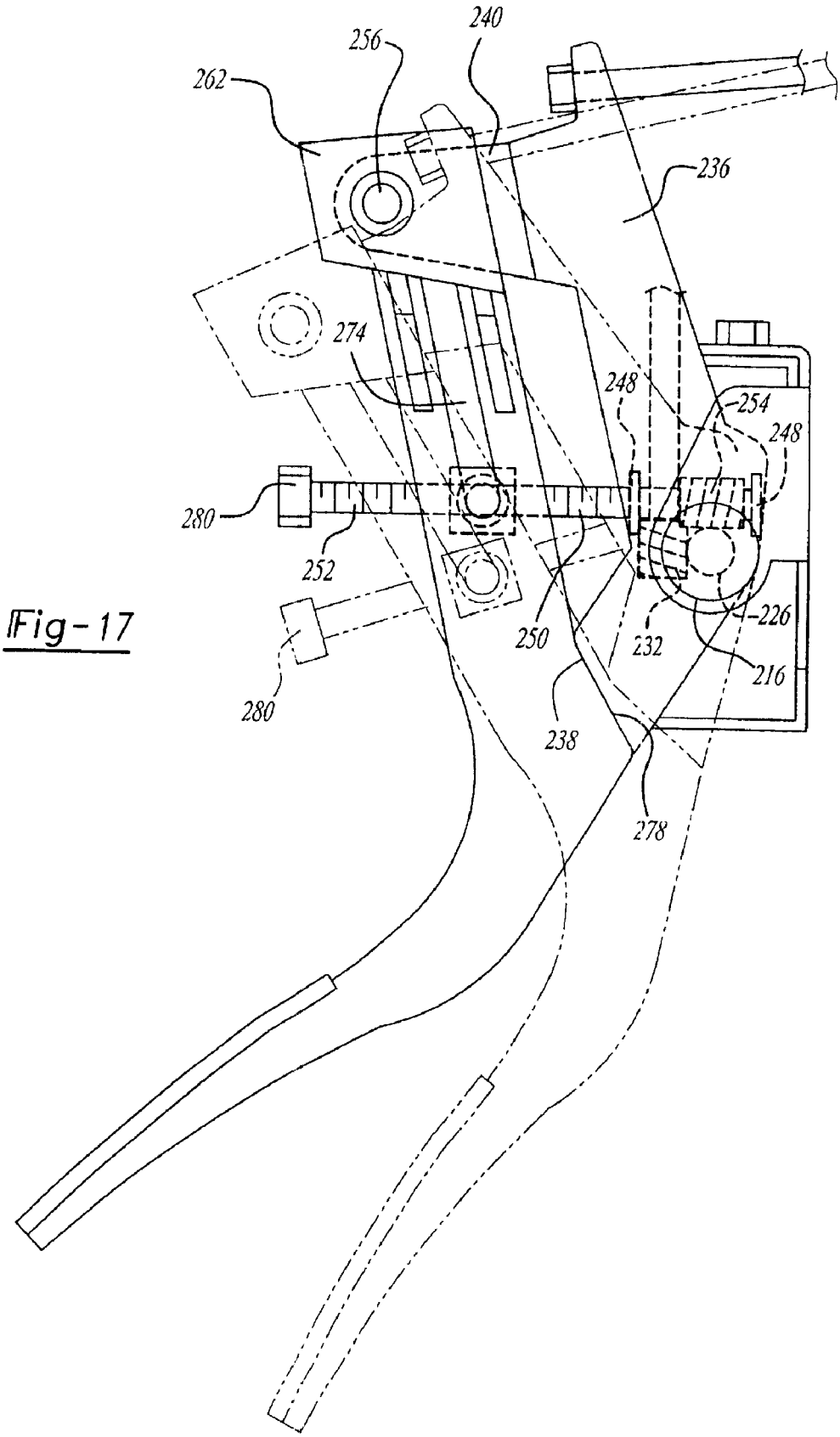
FIG. 17 is a side view of the accelerator pedal adjustment mechanism showing the pedal assembly in a depressed and non-depressed position of the third alternative preferred embodiment of the present invention.

As shown in FIGS. 15 and 17, the support bracket is mounted to the vehicle V as discussed above. The support bracket 214 has a pair of arms 222 having apertures 224 for rotatably receiving the pivot shaft 216.

Figure 16:
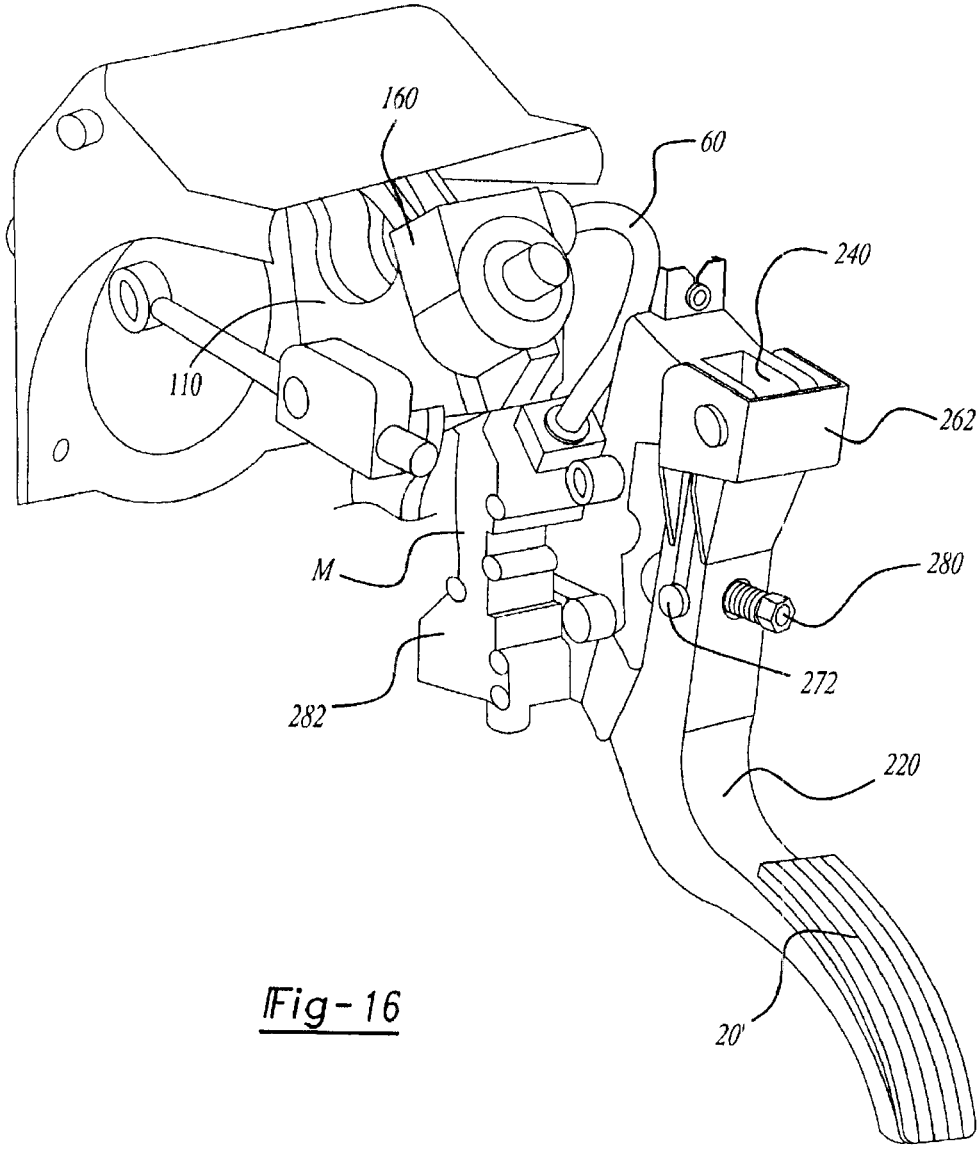
FIG. 16 is a perspective view of the accelerator pedal adjustment mechanism taken from the opposite side of FIG. 17 of the third alternative preferred embodiment.
Figure 19:
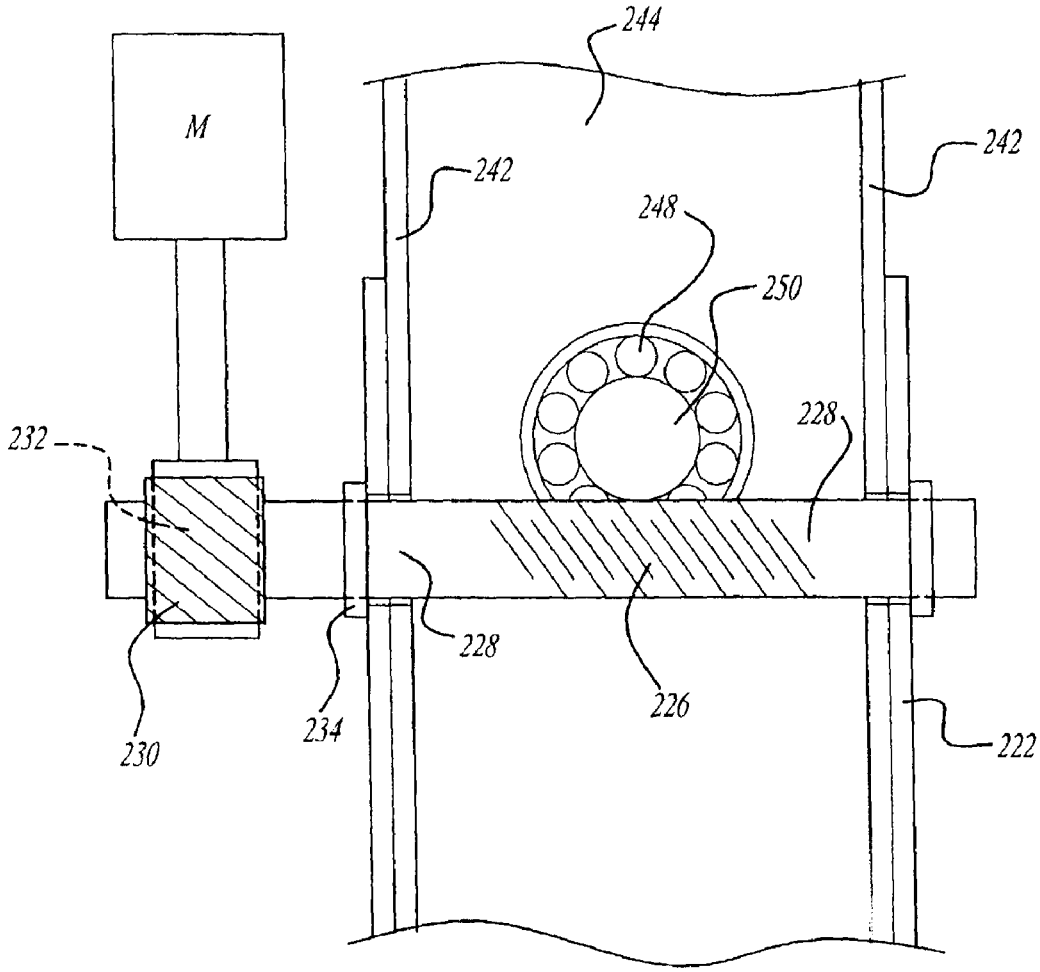
FIG. 19 is a perspective view of the pivot shaft of the accelerator pedal adjustment mechanism of the third alternative preferred embodiment.

As shown in FIG. 19, the pivot shaft 216 includes a worm gear portion 226 which is disposed between a pair of cylindrical surface portions 228 which are rotatably received in the arms 222 of the support bracket 214. A gear wheel 230 is mounted to one end of the pivot shaft 216 to meshingly engage a gear 232 wheel mounted to the motor M. A pair of c-clips 234 hold the pivot shaft 216 in position with respect to the bracket 214. As shown in FIG. 16, the motor M is advantageously mounted to the arm 222 of the support bracket 214 adjacent the brake pedal 110.

As shown in FIGS. 16 and 17, the inner arm 218 has a body portion 236 extending between a lower stop portion 238 and a pair of rearwardly extending support arms 240. The pair of support arms 240 have apertures for receiving a pivot rod 256 for pivotally mounting of the pedal arm 220. The body portion 236 has a pair of side walls 242 and a center portion 244 defining a cavity. The side walls 242 are received between the arms 222 of the support bracket 214. Each side wall 242 has an aperture 246 in a lower forward corner to receive the pivot shaft 216. The inner arm 18 pivots on the smooth portions 228 of the pivot shaft 216.

As shown in FIG. 17, a pair of bearings 248 are mounted in the center portion 244 of the body portion 236 to rotatably support a jack screw 250. The jack screw 250 has a threaded portion 252 which extends from a pinion gear 254. The pinion gear 254 is positioned in the cavity between the side walls 242 of body portion 236 in engagement with worm gear portion 236 of the pivot shaft 216. The pair of bearings 248 support the jack screw 250 for rotation when the pivot shaft 216 is rotated by the motor M.

As shown in FIG. 15, the stop portion 238 is formed on a lower end of the body portion 236 of the inner pedal arm 218 to extend rearwardly in the direction of the driven pedal arm 220. The stop portion 238 is formed to engage a portion of driven pedal arm 220 when the pedal is in a forward adjustment position as shown in FIG. 15. A throttle cable 256 is mounted to the aperture 80 formed in the upper portion of the body portion 236. The inner pedal arm 218 may be formed of rigid material, preferably molded.

As shown in FIG. 15, the pedal arm 220 has a generally L-shape with an upper portion 258 forming a channel and a lower portion 260 supporting the pedal 20'. A collar 262 is formed around a top of the upper portion 258 of the pedal arm 220. The collar 262 has throughbores to receive the pivot pin 242.

The upper portion 258 of the pedal arm has a rear wall 264 and a pair of side walls 266 extending therefrom to form the u-shaped channel. The pair of the side walls 266 are spaced apart to receive a slide block 268 therein. The slide block 268 has a threaded bore 270 for receiving the jack screw 250. A pair of pins 272 extend from opposite sides of the slide block 268 to be received in slots 274 formed in each side wall 266. The slots 274 extend longitudinally downwardly from the top to guide the slide block 268 during adjustment. The rear wall has an aperture 276 for fixedly receiving the threaded portion of the jack screw. The position of the pedal arm 220 may be thus adjusted by rotating the pivot shaft 216 and worm gear 226 to turn the pinion gear 254 and jack screw 250 in the slide block 268 of the pedal arm 220. The slots 274 of the pedal arm 220 permit the slide block 288 to move with respect to the pivot rod 256 as the pedal arm 220 pivots during adjustment.

Figure 18:
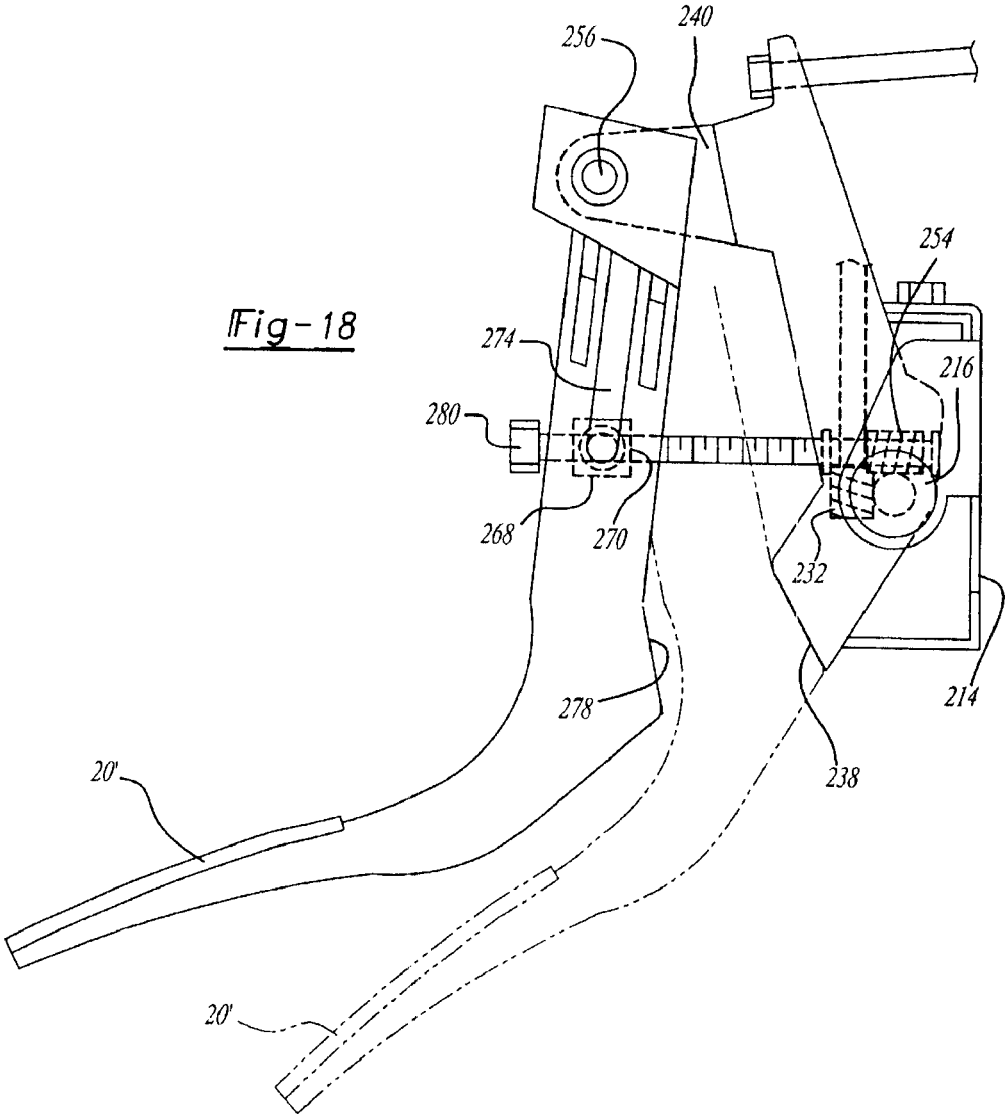
FIG. 18 is a side view showing the adjustability of the brake pedal of the third alternative preferred embodiment of the present invention.

An abutment surface 278 is formed on a front portion of the pedal arm 220 beneath the slots 274. The abutment surface 278 contacts the stop surface 238 of the inner arm 218 when the pedal is in the forward position. The stop flange 280 is formed at the end of the jack screw 250 to stop the travel of the pedal arm 220 at its full rearward adjustment position, as shown in FIG. 18.

As shown in FIG. 16, the motor M is mounted directly to the bracket 214. The motor M includes a gear housing 282 containing the pinion gear 232 which is meshingly engaged with the gear 230 on the end of the pivot shaft 216. Thus, activation of the motor as discussed above turns the pivot shaft 216 to turn the jack screw 250 and adjust the position of the pedal. When the inner arm 218 pivots around the pivot shaft 216 and the pedal 20' is moved, depressed or released during operation of the vehicle, the pinon gear 254 of the jack screw 250 moves along the threads of the worm gear 226. Thus, there is a very small movement of the pinon 254 of the jack screw 250 with respect to the worm gear 226 or the pivot shaft 216. However, this movement is so small as to be negligible in rotating the jack screw so as to change the relative position of the pedal arm 220 to the inner pedal arm 218.

The present invention may also include means for providing a memory option to "remember" and re-set the pedals 20, 20' or pedal arms according to a pre-programmed operator preference. This memory option means may be provided by any suitable means, such as for example, a location transducer such as a potentiometer or encoder. This memory option means may be in a computer module, which module may be integral with the motor M, but may also be separate from it. The motor M may sense the position of the pedals 20, 20' or pedal arms and send the signal to the computer module.

It is to be understood that the motor M may be any suitable motor having any desired specifications, as required and/or necessitated by a particular end use. An exemplary motor is commercially available from DAEWOO, and preferably has a power rating of approximately 1/20 horsepower; however, the power rating may be up to between about 1/4 horsepower and 1/3 horsepower.

As shown in FIGS. 1 and 15, both the brake pedal and accelerator pedal adjusters may be driven by the same driving means (eg. one cable 60 interconnecting the worm gear 58 in accelerator pedal apparatus 10' to the worm gear 58 in brake pedal apparatus 10, 110 to the motor M). The apparatuses 10, 10', 110, and 210 should be set up in order to synchronize the percentage of pedal travel for each of the apparatuses 10, 10' and 110, 210. It is to be further understood that each of the apparatuses 10, 10' and 110, 210 may be driven independently by separate motors and/or may be driven by separate motors but by the same control device; and/or by any combination or subcombination of the above.

The apparatuses of the present invention are further quite quiet in operation—squeaks and/or rattles are substantially prevented by standard plastic bushings for the pedal pivots; and by bronze thrust bearings for the gear drive.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A pedal adjuster for mounting to a bracket mounted to a vehicle, the pedal adjuster comprising:

a pedal assembly including an adjuster member and a pedal arm, said adjuster member mounted to said bracket to pivot said pedal assembly about an adjuster member pivot axis, said pedal arm being mounted to said adjuster member to pivot about a pedal arm pivot axis, said pedal arm pivot axis parallel with and spaced radially outwardly from said adjuster member pivot axis and said bracket;

a drive mechanism mounted to said bracket, said drive mechanism having a rod connected at one end to said pedal arm, means for selectively moving said rod to pivot said pedal arm about said pedal arm pivot axis to adjust the position of said pedal arm with respect to said adjuster member.

2. The pedal adjuster of claim 1, wherein said pedal arm pivot axis is positioned in an upper portion of said adjuster mechanism.

3. The pedal adjuster of claim 1, wherein said pedal arm further comprises a pair of parallel side members, and said rod is mounted between said side members.

4. The pedal adjuster of claim 3, wherein each of said side members have a side member having a slot for receiving a portion of said drive mechanism to guide said rod during movement of said rod.

5. The pedal adjuster of claim 1, wherein said means for moving includes a motor.

*6. The pedal adjuster of claim 9 wherein said pedal arm pivot axis is positioned in an upper portion of said pedal arm.*

*7. The pedal adjuster of claim 9 wherein said adjuster member pivot axis is positioned in a lower portion of said*

*adjuster member, and said pedal arm pivot axis is positioned in an upper portion of said pedal arm.*

*8. The pedal adjuster of claim 9 wherein said drive mechanism extends between an upper portion of said adjuster member and an upper portion of said pedal arm.*

*9. A pedal adjuster for adjusting the position of a pedal in a vehicle relative to a vehicle comprising:*

*a bracket that is mounted to the vehicle;*

*a pedal assembly including an adjuster member and a pedal arm, wherein said adjuster member is mounted to said bracket to pivot said pedal assembly about an adjuster member pivot axis and said pedal arm is pivotally mounted to said adjuster member to pivot about a pedal arm pivot axis, such that said pedal arm pivot axis is parallel with and spaced radially outwardly from said adjuster member pivot axis and said bracket; and*

*a drive mechanism extending between said adjuster member and said pedal arm, wherein said drive mechanism includes a screw rod operatively attached to said pedal arm to selectively position the pedal relative to the vehicle operator.*

*10. A pedal adjuster for adjusting the position of a pedal in a vehicle relative to vehicle operator comprising:*

*a bracket that is mounted to the vehicle;*

*a pedal assembly including an adjuster member and a pedal arm, wherein a lower portion of said adjuster member is mounted to said bracket to pivot said pedal assembly about an adjuster member pivot axis and an upper portion of said pedal arm is pivotally mounted to an upper portion of said adjuster member to pivot about a pedal arm pivot axis, such that said pedal arm pivot axis is parallel with and spaced radially outwardly from said adjuster member pivot axis and said bracket; and*

*a drive mechanism extending between said adjuster member and said pedal arm, wherein said drive mechanism includes a screw rod operatively attached to said pedal arm below said pedal arm pivot axis, to selectively position the pedal relative to the vehicle operator.*

* * * * *

UNITED STATES PATENT AND TRADEMARK OFFICE

CERTIFICATE OF CORRECTION

PATENT NO. : RE42,767 E
APPLICATION NO. : 10/615553
DATED : October 4, 2011
INVENTOR(S) : Larry Willemsen et al.

It is certified that error appears in the above-identified patent and that said Letters Patent is hereby corrected as shown below:

TITLE PAGE, ITEM (75)

Inventors: Larry Willemsen, Morpeth (CA) should read --Larry Willemsen, Ontario (CA)--

Inventors: Gregory Scott Kolwich, Beverly Hills, MI (US) should read --Gregory Scott Kolwich, Ferndale, MI (US)--

Signed and Sealed this
Thirteenth Day of March, 2012

David J. Kappos

David J. Kappos
*Director of the United States Patent and Trademark Office*